(12) United States Patent
Koo et al.

(10) Patent No.: US 8,032,926 B2
(45) Date of Patent: Oct. 4, 2011

(54) METHOD OF CONFIGURING HIERARCHICAL NETWORK OF USER GROUP AND RESOURCE GROUP AND KEY DISTRIBUTION CENTER

(75) Inventors: Han Seung Koo, Daejeon (KR); Yun Jeong Song, Daejeon (KR); Soo In Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1008 days.

(21) Appl. No.: 11/978,877

(22) Filed: Oct. 30, 2007

(65) Prior Publication Data

US 2008/0141177 A1   Jun. 12, 2008

(30) Foreign Application Priority Data

Dec. 6, 2006 (KR) .................. 10-2006-0122877
May 16, 2007 (KR) .................. 10-2007-0047568

(51) Int. Cl.
*H04L 29/00* (2006.01)
*H04L 9/08* (2006.01)

(52) U.S. Cl. .......................................... 726/3; 380/279

(58) Field of Classification Search ................ None
See application file for complete search history.

(56) References Cited

U.S. PATENT DOCUMENTS

| | | | |
|---|---|---|---|
| 5,331,637 A | | 7/1994 | Francis et al. |
| 5,832,092 A | * | 11/1998 | Okuda et al. .................. 380/279 |
| 6,049,878 A | * | 4/2000 | Caronni et al. .................. 726/3 |
| 6,408,336 B1 | * | 6/2002 | Schneider et al. ............. 709/229 |
| 7,065,643 B1 | * | 6/2006 | Cornils et al. ................. 713/163 |
| 2005/0091518 A1 | * | 4/2005 | Agarwal et al. ............... 713/193 |
| 2005/0226248 A1 | * | 10/2005 | Modi et al. .................. 370/395.5 |
| 2008/0013733 A1 | * | 1/2008 | Johansson et al. ............. 380/278 |
| 2009/0245138 A1 | * | 10/2009 | Sapsford et al. .............. 370/254 |

FOREIGN PATENT DOCUMENTS

| | | |
|---|---|---|
| JP | 2006-237837 | 7/2006 |
| KR | 100227794 B1 | 5/1999 |
| KR | 10-2006-0013029 | 2/2006 |
| KR | 1020060090136 | 8/2006 |

OTHER PUBLICATIONS

"Scalable Hierarchical Access Control in Secure Group Communications" by Yan Sun, et al.; *IEEE Infocom* 2004.

* cited by examiner

*Primary Examiner* — Minh Dinh
*Assistant Examiner* — Venkat Perungavoor
(74) *Attorney, Agent, or Firm* — Blakely, Sokoloff, Taylor & Zafman

(57) ABSTRACT

Provided are a method of configuring a hierarchical network of user groups and resource groups, and a key distribution center. The method includes the steps of: analyzing hierarchical connection relationships between respective user groups and respective resource groups, comparing redundancy rates of the respective hierarchical connection relationships, and determining a connection mode having a larger redundancy rate; separating the respective user groups and resource groups and hierarchically connecting the user groups with the resource groups, according to the determined connection mode; comparing hierarchical connections between the respective separated user groups and resource groups, and removing an overlapping hierarchical connection; and recombining the separate hierarchical connections except for the overlapping hierarchical connection, and configuring an entire network.

18 Claims, 7 Drawing Sheets

US 8,032,926 B2

METHOD OF CONFIGURING HIERARCHICAL NETWORK OF USER GROUP AND RESOURCE GROUP AND KEY DISTRIBUTION CENTER

CROSS-REFERENCE TO RELATED APPLICATION

This application claims priority to and the benefit of Korean Patent Application No. 2006-122877, filed Dec. 6, 2006, and No. 2007-47568, filed May 16, 2007, the disclosure of which is incorporated herein by reference in its entirety.

BACKGROUND

1. Field of the Invention

The present invention relates to a method of configuring a hierarchical network of a user group and a resource group and a key distribution center.

The present invention has been produced from the work supported by the IT R&D program of MIC (Ministry of Information and Communication)/IITA (Institute for Information Technology Advancement) [2006-S-019-01, The Development of Digital Cable Transmission and Receive System for 1 Gbps Downstream] in Korea.

2. Discussion of Related Art

As networks are developed, a resource group providing data information in a network is connected in a very complicated manner with a user receiving and using the information in the network, and furthermore, a user connected to each resource group is continuously changed.

In such a complicated network structure, forward secrecy and backward secrecy must be guaranteed in order for network subscribers to freely join, withdraw from and change a group, so that a user and a resource group can have a hierarchical access relationship and safely communicate with each other. Here, the backward secrecy indicates a requirement that a subscriber newly joining a network group must not know communication content between members of the corresponding network before he/she joins, and the forward secrecy indicates a requirement that a subscriber that withdraws from a network group must not know a communication content between members of the corresponding network after he/she withdraws.

To meet the above requirements, key information for information security between each resource group and a currently connected user must be provided to both the user and the resource group, and used requirement keys must be appropriately managed. Particularly, in a centralized method, a key distribution center (KDC) disposed at a head-end performs the above functions.

Meanwhile, performance of a requirement key management method can be verified using communication cost and storage cost according to dynamic membership change of subscribers. The communication cost denotes the amount of messages that a KDC sends to subscribers every time a dynamic membership of a subscriber is generated, and the storage cost denotes key storage capacity for the messages. Needless to say, the lower the costs, the better the key management method is.

Therefore, a method of hierarchically connecting a user group with a resource group has been researched, that is, a method which can minimize key information cost while maintaining both the forward secrecy and the backward secrecy in a relationship where a user group and a resource group are hierarchically connected.

SUMMARY OF THE INVENTION

The present invention is directed to a method and apparatus for configuring a hierarchical network of a user group and a resource group.

The present invention is also directed to a method and apparatus for configuring a hierarchical network of a user group and a resource group that simplify a network configuration by removing hierarchical connection redundancies from the viewpoint of the user group and the resource group.

One aspect of the present invention provides a method of configuring a hierarchical network of user groups and resource groups, the method comprising the steps of: (a) analyzing hierarchical connection relationships between the respective user groups and the respective resource groups, comparing redundancy rates of the respective hierarchical connection relationships, and determining a connection mode having a larger redundancy rate; (b) separating the respective user groups and resource groups and hierarchically connecting the user groups with the resource groups, according to the determined connection mode; (c) comparing hierarchical connections between the respective separated user groups and resource groups, and removing an overlapping hierarchical connection; and (d) recombining the hierarchical connections of step (c), except for the overlapping hierarchical connection, and configuring an entire network.

The redundancy rates may be determined corresponding to a user group set (US) primary redundancy set (UPRS) and a resource group set (RS) primary redundancy set (RPRS). In addition, the UPRS may include elements having the same hierarchical relationship among hierarchical relationships having the respective user groups as their roots, and the elements may not have a common component. In further addition, the RPRS may include elements having the same hierarchical relationship among hierarchical relationships having the respective resource groups as their roots, and the elements may not have a common component. Furthermore, when the elements of the primary redundancy set (PRS) have a common component, only one element having the largest overlap counter (OC) may be included in the PRS.

In addition, the hierarchical connection method of step (b) may be a star graph method whereby an intermediate node is not generated when the respective user groups and resource groups are hierarchically connected. In further addition, roots of the hierarchical connections may be determined according to the connection mode of step (a) when the user groups and resource groups are hierarchically connected.

Further, the overlapping hierarchical connection of step (c) may have the same parent node and child node when the user groups and the resource groups are hierarchically connected. Furthermore, the method may further comprise the step of, after removing the overlapping hierarchical connection, integrating the hierarchical relationships between the respective user groups and resource groups to complete hierarchical relationships between the total user groups and resource groups, and aligning roots and end-nodes of the hierarchical relationships.

Another aspect of the present invention provides a key distribution server managing a centralized network connecting at least one user group with at least one resource group, the key distribution server comprising: means for analyzing a hierarchical connection relationship between each user group and each resource group, comparing redundancy rates of the respective hierarchical connection relationships, and determining a connection mode having a larger redundancy rate; means for hierarchically connecting the user group with the resource group according to the determined connection mode; and means for removing an overlapping hierarchical connection from the hierarchical connection between the user group and resource group.

The redundancy rates may be determined corresponding to a UPRS and a RPRS. In addition, the UPRS may include elements having the same hierarchical relationship among hierarchical relationships having the respective user groups as their roots, and the elements may not have a common component. In further addition, the RPRS may include elements having the same hierarchical relationship among hierarchical relationships having the respective resource groups as their roots, and the elements may not have a common component. Furthermore, when the elements of the PRS have a common component, only one element having the largest overlap counter may be included in the PRS.

In addition, the hierarchical connection method may be a star graph method whereby an intermediate node is not generated when each user group and each resource group are hierarchically connected.

In further addition, a root of the hierarchical connections may be determined according to the connection mode when the user group and resource group are hierarchically connected. In still further addition, the overlapping hierarchical connection may have the same parent node and child node when the user group and the resource group are hierarchically connected. Furthermore, the key distribution server may further comprise means for, after the overlapping hierarchical connection is removed, integrating the hierarchical relationship between each user group and each resource group to complete a hierarchical relationship between the total user groups and resource groups, and aligning a root and an end-node of the hierarchical relationship.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
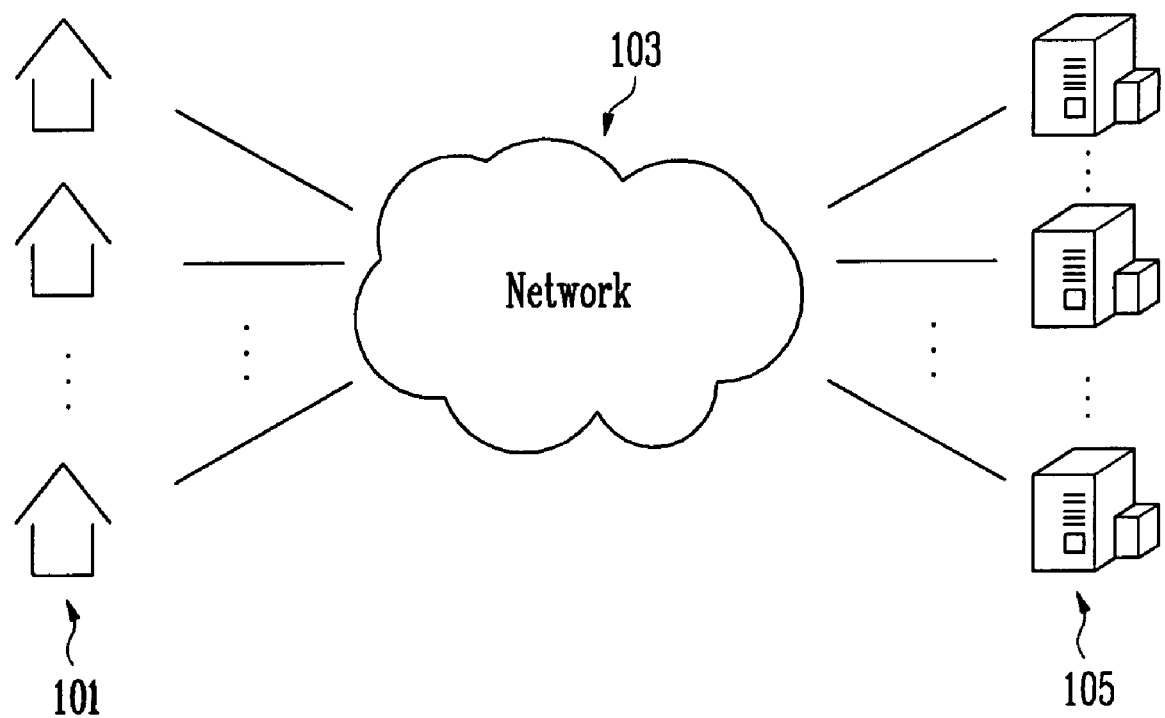
FIG. 1 illustrates an example of hierarchical network connections between user groups and resource groups according to the present invention.

FIG. 1 illustrates an example of hierarchical network connections between user groups and resource groups according to the present invention.

Referring to FIG. 1, connections between user groups 101 and resource groups 105 in a general network 103 are shown. In the network 103, the user groups 101 and the resource groups 105 can be hierarchically connected. Each user group 101 may be connected with the plurality of resource groups 105, and also, each resource group 105 may be connected with the plurality of user groups 101. In the hierarchical connection network 103, the user groups 101 and the resource groups 105 may communicate with each other. Here, when the user groups 101 freely withdraw from, join and change the resource groups 105, information security on the withdrawal, joining and change must be ensured.

Such an information security message may be composed in a very complex manner when the network 103 is activated. Here, when the information security message is provided to each of the user groups 101 or the resource groups 105, an amount of the information security messages may increase by geometric progression. Thus, it is very important to reduce the amount of the messages and a storage space for the messages. To this end, it is of great importance to efficiently configure the hierarchical network connection relationships between the user groups 101 and the resource groups 105 constituting the network 103.

Such a hierarchical network connection method is of great importance when most networks providing a centralized communication system offer a group communication service requiring security. In general, the hierarchical network connection method is mainly administered by a key distribution center (KDC), which manages each network.

Figure 2:
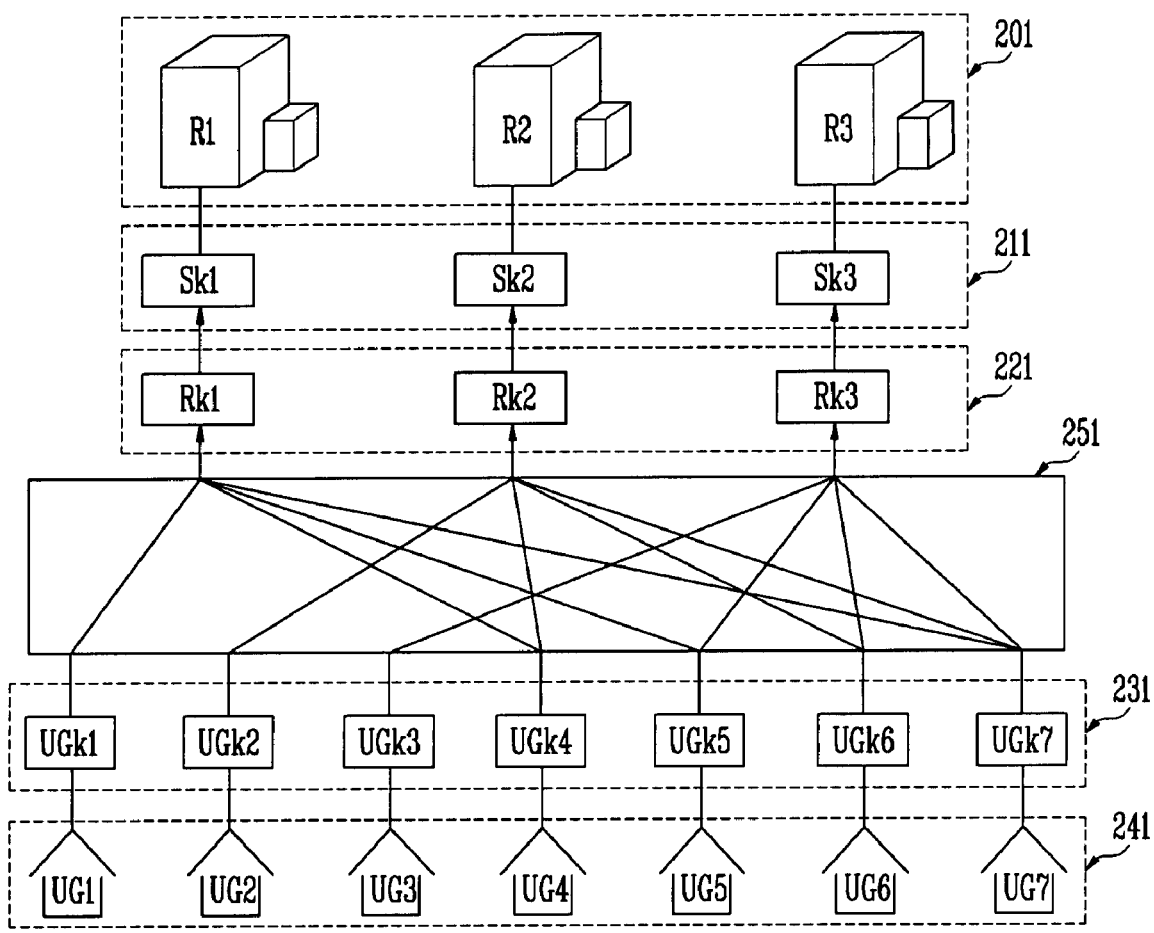
FIG. 2 illustrates hierarchical access relationships to which the present invention will be applied.

FIG. 2 illustrates hierarchical access relationships to which the present invention will be applied.

Referring to FIG. 2: UGs 241 denotes user groups; Rs 201 denotes resource groups; USs denotes user group sets UG1, UG2, . . . , and UGn; RSs denotes resource group sets R1, R2, R3, . . . , and Rm; and US(Rm) denotes {UGn|UGn is a US capable of accessing Rm}. In addition, in FIG. 2, "A→B" denotes that B is encoded using A, which can be expressed by {B}A.

In FIG. 2, a first layer connected with the resource groups 201 is the layer of session keys (SKs) 211. The SKs 211 are connected with resource keys (RKs) 221, respectively. And, the SKs 211 serve to prevent communication cost increase, that is, the amount of data in a message informing of changes when information is updated by periodical changes in encryption. In general, a resource group is directly encoded for information security. Here, when a plurality of lower layers are directly connected with the encoded resource group, communication cost significantly increases because an encryption key must be encoded for each of the connected lower layers and transferred. Therefore, the SKs 211 are connected with the Rs 201, respectively.

A second layer is the layer of resource keys (RKs) 221. The RK layer is connected with the layer of SKs 211, and also serves to reduce communication cost for encryption of the Rs 201 in combination with the SKs 211.

A third layer is the layer of user group keys (UGKs) 231, which are connected with the UGs 241, respectively. The UGKs 231 serve to authenticate the members of the UGs 241.

A connection network 251 configured using the respective keys is shown in FIG. 2.

Ultimately, such a hierarchical configuration and hierarchical keys minimize communication cost while maintaining forward secrecy and backward secrecy when a UG is connected with an R.

Here, the forward secrecy indicates that a subscriber withdrawn from a group must not know communication content of members of the group after his/her withdrawal, and the backward secrecy indicates that a subscriber newly joining a group must not know communication content of members of the group before he/she joins.

A method of distributing a hierarchical encryption key to maintain the forward and backward secrecy will be described with reference to the hierarchical connection diagram. First, it is assumed that a set of all keys used for composing a key distribution message is KS(UGn). In FIG. 2, KS(UG1) will be (RK1, Sk1). Here, key distribution methods will be described for cases in which a user withdraws from a group, joins a group, and changes a group, respectively.

First, when a user withdraws from a group, i.e., a user belonging to UGn withdraws from UGn, information of all keys included in KS(UGn) must be updated to ensure the forward secrecy with respect to the withdrawn user. Then, update information is transferred to all members of UGn except for the withdrawn user.

Second, when a user newly joins a user group, i.e., there is a new subscriber in UGn, members included in existing UGn are provided with newly updated key information, and the key information of KS(UGn) is provided to the new subscriber.

Third, when a member of a user group is changed, i.e., a subscriber included in UGn moves to UGm, keys not belonging to KS(UGm) among key information belonging to KS(UGn) are updated, and key information is transferred to remaining members of UGn, for the sake of the forward secrecy. In addition, for the backward secrecy, members of existing UGm are provided with newly updated key information, and key information of KS(UGm) is provided to the new subscriber.

Such key information update and distribution is generally managed by a KDC managing a centralized network, and a subscriber group or resource group also needs equipment or an algorithm capable of transceiving key information managed by the KDC.

Figure 3:
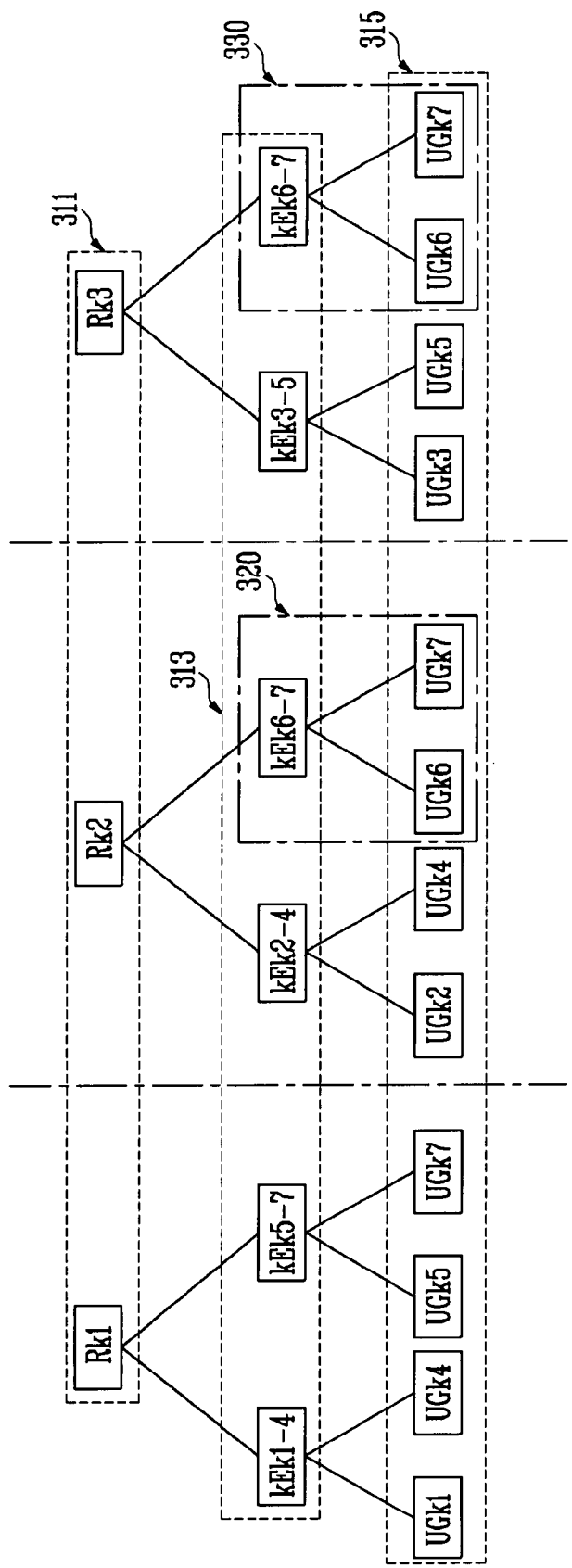
FIG. 3 illustrates a conventional hierarchical connection method compared to the present invention.

FIG. 3 illustrates a conventional hierarchical connection method compared to the present invention.

A method described in FIG. 3 is referred to as an MG technique. First, binary key trees are generated which have respective RKns 311 as their roots and UGKs 315 corresponding to US(Rn) as end-nodes. The total number of key trees to be generated is the same as the number n(RS) of Rs. And, key encryption keys (KEKs) 313 are allocated to intermediate nodes of the binary key trees. In FIG. 3, "KEK i–j" denotes a KEK that has lower layer keys UGK i and UGK j. When the RKs 311, KEKs 313 and UGKs 315 are connected using themselves only once while maintaining the property of n(RS) key trees formed as described above, a connection network is configured. Here, the respective trees are compared with each other, and parts having the same parent node and child node in the trees are merged together upon configuration of the network, thereby removing redundancy.

FIG. 3 shows reconfiguration of the network connections shown in FIG. 2. In particular, the tree structure of a part 320 and the tree structure of a part 330 have the same parent node and child nodes. Therefore, the parts 320 and 330 may be merged together when the connection network is configured.

Figure 4:
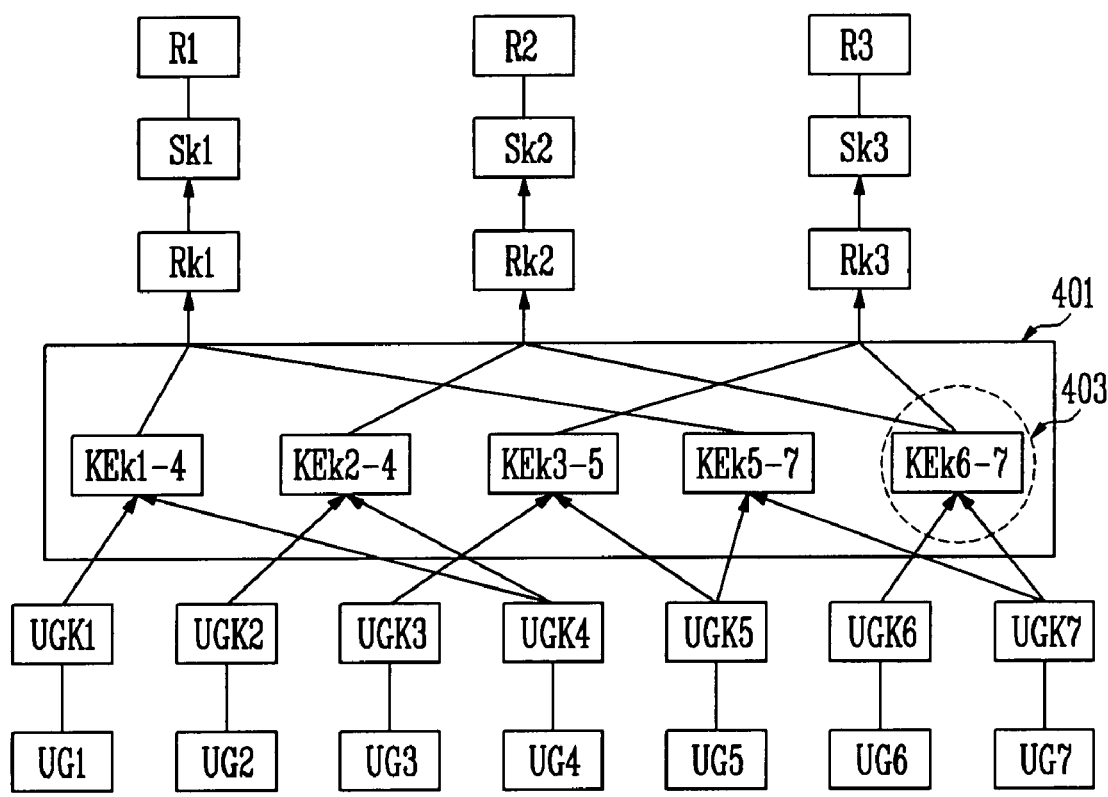
FIG. 4 shows a configuration of a network using a conventional hierarchical connection method compared to the present invention.

FIG. 4 shows a configuration of a network using a conventional hierarchical connection method compared to the present invention. Referring to FIG. 4, a network is shown which is formed by combining the binary key trees configured in FIG. 3. It can be seen that connections of the network configuration of FIG. 4 are more simplified than those of the network configuration of FIG. 2.

In particular, it can be seen that a part 403 of KEK 6-7 is formed by combining 2 binary key trees as described with reference to FIG. 3.

By the configuration of connections using KEKs 401, the network configuration is simplified in comparison with the original network configuration shown in FIG. 2. In addition, by the simplicity of the network configuration, key message transfer redundancy is removed, thus reducing communication cost.

However, the method checks only a key tree with respect to US(Ri), and thus cannot remove network redundancy in various ways.

Figure 5:
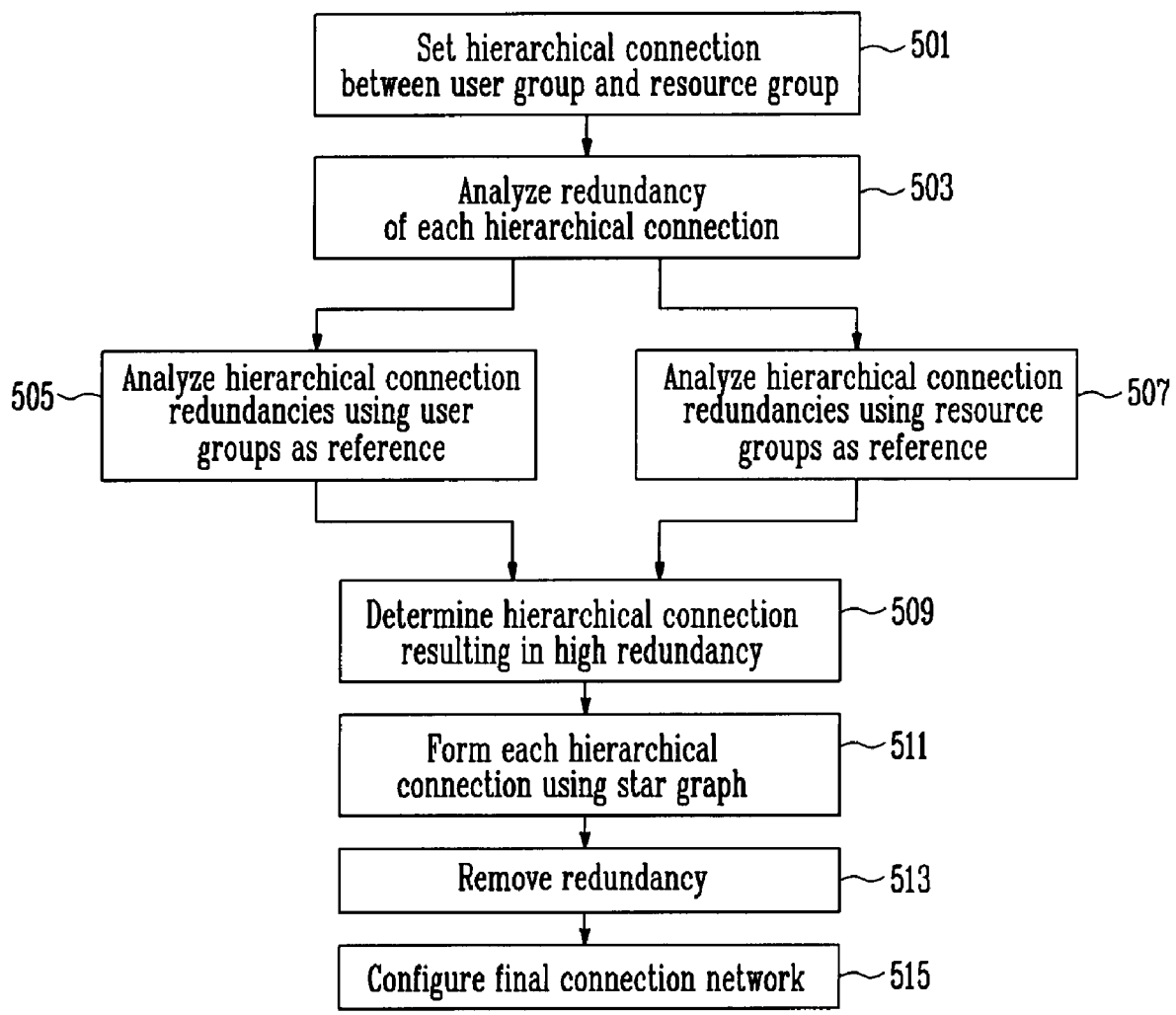
FIG. 5 is a flowchart showing a method of configuring a hierarchical network of a user group and a resource group according to an exemplary embodiment of the present invention.

FIG. 5 is a flowchart showing a method of configuring a hierarchical network of a user group and a resource group according to an exemplary embodiment of the present invention.

Referring to FIG. 5, first, hierarchical connections between user groups and resource groups are set up (step 501). Subsequently, hierarchical connection redundancies are determined (step 503). Here, the hierarchical connection redundancies are determined using UGs as a reference (step 505) and using Rs as a reference (step 507). Subsequently, on the basis of the determination results, it is determined which reference results in higher hierarchical connection redundancies (step 509), and hierarchical connections according to the determined reference are formed into star graphs (step 511). Subsequently, an overlapping part is removed while combining the respective hierarchical connections (step 513). Finally, hierarchical connections of the entire network are completed (step 515).

In the hierarchical connection method processed according to an exemplary embodiment of the present invention as described above, it is important to find out which reference results in a higher redundancy. Here, when US(Ri) results in a higher redundancy, a US connection mode may be used, and when RS(UGi) results in a higher redundancy, an RS connection mode may be used.

Such a redundancy is determined using a redundancy rate, which may be determined by a primary redundancy set (PRS).

Here, the PRS indicates a set that has, as its elements, USs(Ri) each having at least one US(Rj) including the US(Ri) itself, and the elements do not have a common component, or a set that has, as its elements, RSs(UGi) each having at least one RS(UGj) including the RS(UGi) itself, and the elements do not have a common component.

Here, the PRS of the former case is defined as a US primary redundancy set (UPRS), and the PRS of the latter case is defined as an RS primary redundancy set (RPRS).

In addition, when elements have a common component, but there are at least 2 USs(Ri) or RSs(UGi) meeting the definition of a PRS, only an element having the largest overlap counter (OC) is included in the PRS. Here, an OC indicates the number of USs(Rj) or RSs(UGj) including a US(Ri) or an RS(UGi) itself. When there are a plurality of elements having the same OC, an element having a large length, i.e., an element having the largest n(US(Ri)) or n(RS(UGi)), is included in the PRS.

The above-described process can be expressed as an algorithm below.

---
[Algorithm 1]

1. Determine UPRS using US mode
1) Determine candidate elements of UPRS satisfying formula below.

$$W = \{US(Ri) \mid \Phi_{i,j}^{UG} \geq 2, i \text{ and } j \{1, 2, \ldots, T\}, i \neq j\}, \text{ here, } T = n(RS)$$

2) Check whether elements of W do not have common component $$\text{if } X = \{Wn \mid \Phi_{i,j}^{UG} = 0, i \text{ and } j \{1, 2, \ldots, T\}, i \neq j\} \neq \phi, \text{ here, } K = n(W)$$

(a) calculate OCs for $\{X1, X2, \ldots, Xn\}$
$OC = \{\pi1, \pi2, \pi3, \ldots, \pi n\}$
$P = \{Xi \mid MAX(\pi1, \pi2, \pi3, \ldots, \pi n) = \pi i\}$
(b) if $n(P) = 1$, let add P to UPRS
(c) else if $n(P) \neq 1$, let add MAX(P) to UPRS
(d) else let add X1 to UPRS
Otherwise UPRS = W
2. Determine RPRS using RS mode
1) Determine candidate elements of RPRS satisfying a formula below.

$$Y = \{RS(UGi) \mid \Omega_{i,j}^{R} \geq 2, i \text{ and } j \{1, 2, \ldots, L\}, i \neq j\}, \text{ here, } L = n(US)$$

2) Check whether elements of Y do not have a common component $$\text{if } Z = \{Yn \mid \Omega_{i,j}^{R} = 0, i \text{ and } j \{1, 2, \ldots, L\}, i \neq j\} \neq \phi, \text{ here, } M = n(Y)$$

(a) calculate OCs for $\{Y1, Y2, \ldots, Yn\}$
$OC = \{\psi1, \psi2, \psi3, \ldots, \psi n\}$
$H = \{Yi \mid MAX(\psi1, \psi2, \psi3, \ldots, \psi n) = \psi i\}$
(b) if $n(H) = 1$, let add H to RPRS
(c) else if $n(H) \neq 1$, let add MAX(H) to RPRS
(d) else let add Y1 to RPRS
Otherwise RPRS = Y

---

Here, $$\Phi_{i,j}^{UG}$$

denotes the number of elements satisfying $\{((US(Ri) \cap US(Rj))\char`^((US(Ri) \subset US(Rj))\}$, $$\Phi_{i,j}^{R}$$

denotes the number of elements satisfying $\{((RS(UGi) \cap RS(UGj))\char`^((RS(UGi) \subset RS(UGj))\}$. Here, i and j are elements of $\{1, 2, \ldots, L\}$, and L is n(RS) in a case of $$\Phi_{i,j}^{UG},$$

and L is n(US) in a case of $$\Phi_{i,j}^{R}.$$

And, $$\Omega_{i,j}^{UG} \text{ and } \Omega_{i,j}^{R}$$

are defined below.

$$-\Omega_{i,j}^{UG} = 1,$$

if US(Ri) and US(Rj) do not have a common component, i.e., US(Ri)∩US(Rj)=ϕ, otherwise $$\Omega_{i,j}^{UG} = 0$$

$$-\Omega_{i,j}^{UG} = 1,$$

if RS(UGi) and RS(UGj) do not have a common component, i.e., RS(UGi)∩RS(UGj)=ϕ, otherwise $$\Omega_{i,j}^{R} = 0$$

When the algorithm is applied to the network configuration of FIG. 2, the UPRS does not have an element satisfying $$\Phi_{i,j}^{UG} \geq 2$$

and thus becomes a null set. On the other hand, the RPRS has 3 elements RS(UG4)={R1, R2}, RS(UG5)={R1, R3}, and RS(UG6)={R2, R3} satisfying $$\Phi_{i,j}^{R} \geq 2.$$

In other words, Y={RS(UG4), RS(UG5), RS(UG6)}. Subsequently, it must be checked whether elements of Y do not have a common component. Here, elements of Y have a common component. When elements have a common component like this, OCs for respective elements are calculated. In this example, Y(1), Y(2) and Y(3) all have the same OC of 2. When the PRS cannot be determined using OCs like this, one of Y(1), Y(2) and Y(3) having the largest length is determined as an element of the PRS by the method according to an exemplary embodiment of the present invention. However, in this example, Y(1), Y(2) and Y(3) all have the same length of 2. As a result, any one of Y(1), Y(2) and Y(3) can be selected and included in the RPRS as an element. In this algorithm, Y(1) is selected as an element of the RPRS. In other words, RPRS={RS(UG4)}.

In this way, the UPRS and the RPRS can be determined. And, a redundancy rate is obtained through an algorithm below.

[Algorithm 2]

1. Compare redundancy rates of respective redundancy sets
   √ Overlap count of UPRS
   a) $\{\alpha_1, \alpha_2, \ldots, \alpha_n\}$
   b) let $Q = \Sigma\{\alpha_1, \alpha_2, \ldots, \alpha_n\}$
   √ Overlap count of RPRS
   a) $\{\beta_1, \beta_2, \ldots, \beta_n\}$
   b) let $P = \Sigma\{\beta_1, \beta_2, \ldots, \beta_n\}$
   √ if $Q \geqq P$, set mode as US mode, else set mode as RS mode
2. Configure connection network using the determined mode As a result, in the example of FIG. 2, hierarchical connections are made using the RS mode.

Thus far, a process to the step of determining a redundancy reference (step 509) has been described in detail. The remaining steps will be described in detail with reference to FIGS. 6 and 7.

Figure 6:
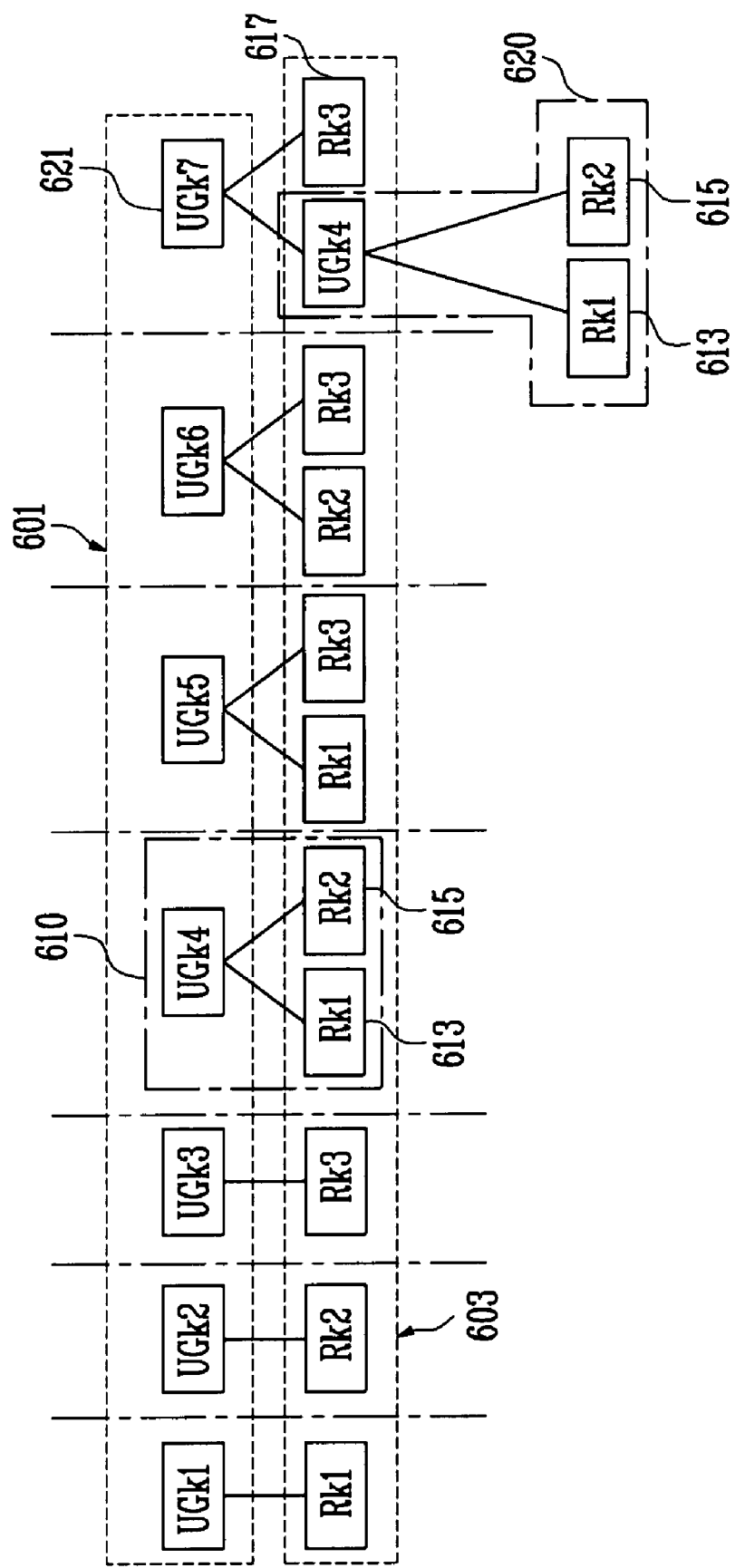
FIG. 6 illustrates a method of configuring a hierarchical network of a user group and a resource group according to an exemplary embodiment of the present invention.

FIG. 6 illustrates a method of configuring a hierarchical network of a user group and a resource group according to an exemplary embodiment of the present invention.

With reference to FIG. 6, the method for hierarchical network connection will be described using the network configuration of FIG. 2. First, as illustrated in FIG. 5, the RS mode is used in the network configuration of FIG. 2. Therefore, a star graph can be composed which has UGKs 601 as its root, and has RKs 603 following the root as an end-node.

Here, when there is a star graph having the same end-nodes RK1 613 and RK2 615 as a star graph composed of requirement keys corresponding to RS(UG4)={R1, R2} 610 included in the RPRS, the end-nodes are replaced by the star graph corresponding to the RPRS.

In FIG. 6, the requirement keys corresponding to RS(UG4)={RK1, RK2} 610 include an RK1 613 and an RK2 615 that are their end-nodes in a star graph composed of requirement keys corresponding to RS(UG7)={R1, R2, R3} 620. Therefore, a star graph is recomposed which has a UGK7 621 as its root key, and has the RK1 613, the RK2 615 and an RK3 617 as its end-nodes to include them as child nodes of the UGK7 621.

Figure 7:
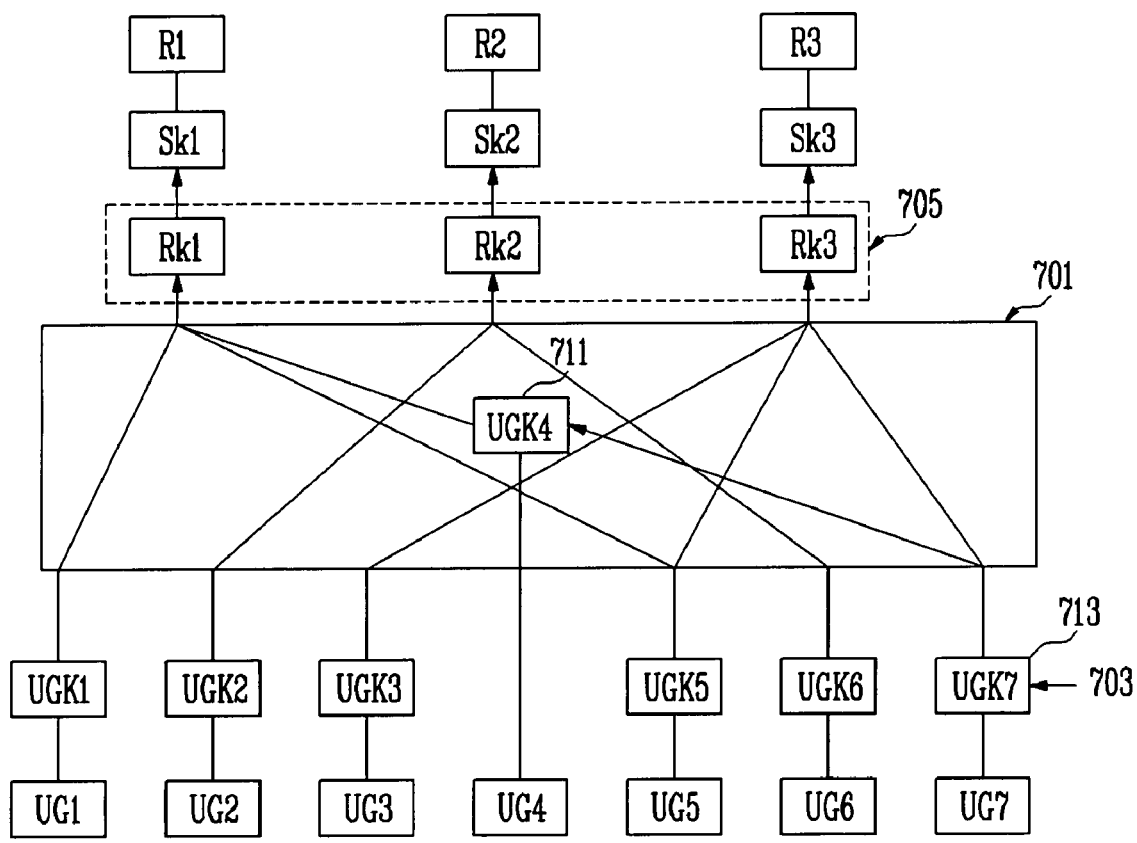
FIG. 7 shows a configuration of a network using a method of configuring a hierarchical network of a user group and a resource group according to an exemplary embodiment of the present invention.

FIG. 7 shows a configuration of a network using a method of configuring a hierarchical network of a user group and a resource group according to an exemplary embodiment of the present invention. Referring to FIG. 7, hierarchical connections according to respective star graphs composed in FIG. 6 constitute a connection network 701.

After arranging UGKs 703 and RKs 705, they are connected with each other according to a hierarchical relationship determined between the RKs 705 and the UGKs 703, thereby integrating the respective star graphs composed in FIG. 6. Here, the star graph composed of requirement keys corresponding to RS(UG4) is a part of the star graph composed of requirement keys of RS(UG7), and thus a UGK4 711 becomes a lower node of a child node of a UGK7 713. In addition, when a connection network is configured using the RS mode, the UGKs 703 become root keys, thus forming a contrary structure of FIG. 7. Therefore, the structure is turned upside down to dispose upper keys in an upper part, thereby configuring a complete connection network shown in FIG. 7.

According to the present invention, it is possible to provide a method and apparatus for configuring a hierarchical network of a user group and a resource group.

In addition, it is possible to provide a method and apparatus for configuring a hierarchical network of a user group and a resource group that simplify a network configuration by removing hierarchical connection redundancies from the viewpoint of the user group and the resource group.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of configuring a hierarchical network of user groups and resource groups, the method comprising the steps of:
    (a) analyzing hierarchical connection relationships between the respective user groups and the respective resource groups, comparing redundancy rates of the respective hierarchical connection relationships, and determining a connection mode having a larger redundancy rate;
    (b) separating the respective user groups and resource groups and hierarchically connecting the user groups with the resource groups, according to the determined connection mode;
    (c) comparing hierarchical connections between the respective separated user groups and resource groups, and removing an overlapping hierarchical connection; and
    (d) recombining the hierarchical connections of step (c) except for the overlapping hierarchical connection, and configuring an entire network, wherein the redundancy rates are determined corresponding to a user group set (US) primary redundancy set (UPRS) and a resource group set (RS) primary redundancy set (RPRS),
    said analyzing, separating, comparing and recombining being performed by a server computer executing instructions stored in a memory to perform said steps.

2. The method of claim 1, wherein the UPRS includes elements having the same hierarchical relationship among hierarchical relationships having the respective user groups as their roots, and the elements do not have a common component.

3. The method of claim 1, wherein the RPRS includes elements having the same hierarchical relationship among hierarchical relationships having the respective resource groups as their roots, and the elements do not have a common component.

4. The method of claim 2, wherein when the elements of the primary redundancy set (PRS) have a common component, only one element having the largest overlap counter (OC) is included in the PRS.

5. The method of claim 3, wherein when the elements of the primary redundancy set (PRS) have a common component, only one element having the largest overlap counter (OC) is included in the PRS.

6. The method of claim 1, wherein the hierarchical connection method of step (b) is a star graph method whereby an intermediate node is not generated when the respective user groups and resource groups are hierarchically connected.

7. The method of claim 6, wherein when the user groups and resource groups are hierarchically connected, roots of the hierarchical connections are determined according to the connection mode of step (a).

8. The method of claim 1, wherein when the user groups and resource groups are hierarchically connected, the overlapping hierarchical connection of step (c) has the same parent node and child node.

9. The method of claim 1, further comprising the step of, after removing the overlapping hierarchical connection, integrating the hierarchical connection relationships between the respective user groups and resource groups to complete hierarchical relationships between the total user groups and resource groups, and aligning roots and end-nodes of the hierarchical relationships.

10. A key distribution server managing a centralized network connecting at least one user group with at least one resource group, the key distribution server comprising:
a memory storing instructions;
a processor executing the instructions to:
i) analyze a hierarchical connection relationship between each user group and each resource group, compare redundancy rates of the respective hierarchical connection relationships, and determine a connection mode having a larger redundancy rate;
hierarchically connect the user group with the resource group according to the determined connection mode; and
removing an overlapping hierarchical connection from the hierarchical connection between the user group and resource group,
wherein the redundancy rates are determined corresponding to a user group set (US) primary redundancy set (UPRS) and a resource group set (RS) primary redundancy set (RPRS).

11. The key distribution server of claim 10, wherein the UPRS includes elements having the same hierarchical relationship among hierarchical relationships having the respective user groups as their roots, and the elements do not have a common component.

12. The key distribution server of claim 10, wherein the RPRS includes elements having the same hierarchical relationship among hierarchical relationships having the respective resource groups as their roots, and the elements do not have a common component.

13. The key distribution server of claim 11, wherein when the elements of the primary redundancy set (PRS) have a common component, only one element having the largest overlap counter (OC) is included in the PRS.

14. The key distribution server of claim 12, wherein when the elements of the primary redundancy set (PRS) have a common component, only one element having the largest overlap counter (OC) is included in the PRS.

15. The key distribution server of claim 10, wherein the hierarchical connection method is a star graph method whereby an intermediate node is not generated when each user group and each resource group are hierarchically connected.

16. The key distribution server of claim 15, wherein when the user group and the resource group are hierarchically connected, a root of the hierarchical connection is determined according to the connection mode.

17. The key distribution server of claim 10, wherein when the user group and the resource group are hierarchically connected, the overlapping hierarchical connection has the same parent node and child node.

18. The key distribution server of claim 10, wherein the processor further executes instructions to after removing the overlapping hierarchical connection, integrate the hierarchical connection relationship between each user group and each resource group to complete a hierarchical relationship between the total user groups and resource groups, and align a root and an end-node of the hierarchical relationship.

* * * * *